US008822916B2

(12) United States Patent
Guna

(10) Patent No.: US 8,822,916 B2
(45) Date of Patent: Sep. 2, 2014

(54) METHOD OF OPERATING TANDEM ION TRAPS

(75) Inventor: Mircea Guna, North York (CA)

(73) Assignee: DH Technologies Development Pte. Ltd., Singapore (SG)

( * ) Notice: Subject to any disclaimer, the term of this patent is extended or adjusted under 35 U.S.C. 154(b) by 58 days.

(21) Appl. No.: 13/340,176

(22) Filed: Dec. 29, 2011

(65) Prior Publication Data

US 2012/0091334 A1 Apr. 19, 2012

Related U.S. Application Data

(63) Continuation-in-part of application No. 12/480,160, filed on Jun. 8, 2009, now Pat. No. 8,766,170.

(60) Provisional application No. 61/120,674, filed on Dec. 8, 2008.

(51) Int. Cl.

| | |
|---|---|
| ***B01D 59/44*** | (2006.01) |
| ***H01J 49/00*** | (2006.01) |
| ***H01J 49/42*** | (2006.01) |
| ***H01J 49/06*** | (2006.01) |

(52) U.S. Cl.

CPC ......... *H01J 49/4265* (2013.01); *H01J 49/0031* (2013.01); *H01J 49/061* (2013.01); *H01J 49/004* (2013.01)

USPC ............................ 250/282; 250/281; 250/288

(58) Field of Classification Search

CPC ........................................................ B01D 59/44

USPC .......................................................... 250/282

See application file for complete search history.

(56) References Cited

U.S. PATENT DOCUMENTS

| | | | |
|---|---|---|---|
| 2,939,952 | A | 12/1954 | Paul et al. |
| 4,755,670 | A | 7/1988 | Syka et al. |
| 5,179,278 | A | 1/1993 | Douglas |
| 5,420,425 | A | 5/1995 | Bier et al. |
| 5,783,824 | A | 7/1998 | Baba et al. |

(Continued)

FOREIGN PATENT DOCUMENTS

| | | |
|---|---|---|
| GB | 2449760 | 12/2008 |
| WO | WO2006/075182 | 7/2006 |

(Continued)

OTHER PUBLICATIONS

Wang, Houle et al., "A Quit-q-o TOF Mass Spectrometer for Multi-Dimensional MS/MS in High Throughput Proteomics".

(Continued)

*Primary Examiner* — Phillip A Johnston

(57) ABSTRACT

A method for operating tandem ion traps is provided, involving a) accumulating ions in the first ion trap at a first time; b) transmitting a first plurality of ions out of the first ion trap and into the second ion trap at a second time, the first plurality of ions having masses within a first mass range; c) retaining a second plurality of ions in the first ion trap at the second time, the second plurality of ions having masses within a second mass range different from the first mass range; d) transmitting the first plurality of ions out of the second ion trap at a third time; and, e) transmitting the second plurality of ions out of the first ion trap and into the second ion trap at the third time.

16 Claims, 10 Drawing Sheets

(56) References Cited

U.S. PATENT DOCUMENTS

| | | | | |
|---|---|---|---|---|
| 6,177,668 | B1 | 1/2001 | Hager | |
| 6,417,511 | B1 | 7/2002 | Russ, IV et al. | |
| 6,483,109 | B1 | 11/2002 | Reinhold et al. | |
| 6,627,876 | B2 | 9/2003 | Hager | |
| 6,627,883 | B2 | 9/2003 | Wang et al. | |
| 6,770,871 | B1 | 8/2004 | Wang et al. | |
| 6,897,438 | B2 | 5/2005 | Soudakov et al. | |
| 6,967,323 | B2 * | 11/2005 | Hashimoto et al. | 250/281 |
| 7,072,038 | B2 | 7/2006 | Quist et al. | |
| 7,084,398 | B2 | 8/2006 | Loboda et al. | |
| 7,119,331 | B2 | 10/2006 | Chang et al. | |
| 7,217,919 | B2 | 5/2007 | Boyle et al. | |
| 7,227,137 | B2 * | 6/2007 | Londry et al. | 250/292 |
| 7,285,774 | B2 | 10/2007 | Guevremont | |
| 7,361,311 | B2 * | 4/2008 | Cooks et al. | 250/284 |
| 7,498,571 | B2 * | 3/2009 | Makarov et al. | 250/292 |
| 2004/0135080 | A1 | 7/2004 | Ouyang et al. | |
| 2005/0269504 | A1 | 12/2005 | Hashimoto et al. | |
| 2007/0045533 | A1 | 3/2007 | Krutchinsky et al. | |
| 2007/0258861 | A1 * | 11/2007 | Barket et al. | 422/89 |
| 2008/0073497 | A1 | 3/2008 | Kovtoun | |
| 2008/0142705 | A1 | 6/2008 | Schwartz et al. | |
| 2008/0210860 | A1 | 9/2008 | Kovtoun | |

FOREIGN PATENT DOCUMENTS

| | | |
|---|---|---|
| WO | WO2007/072038 | 6/2007 |
| WO | WO2009/030900 | 3/2009 |
| WO | WO2009/150410 | 12/2009 |

OTHER PUBLICATIONS

International Search Report of PCT Application No. PCT/CA2009/000805, mailed on Sep. 8, 2009.

International Search Report of PCT Application No. PCT/CA2009/000812, mailed on Sep. 1, 2009.

Co-pending U.S. Appl. No. 12/480,829, Multipole Ion Guide for Providing an Axial Electric Field Whose Strength Increases With Radial Position, and a Method of Operating a Multipole Ion Guide Having Such an Axial Electric Field, filed Jun. 9, 2009.

Krutchinsky, A. et al., "A Novel High-Capacity Ion Trap-Quadrupole Tandem Mass Spectrometer," International Journal of Mass Spectrom. (2007), in press, doi: 10.1106/j.ijms.2007.06.15.

Lorrain, Paul et al., "Electromagnetic Fields and Waves, Second Edition," W.H. Freeman and Company, San Francisco, 1970, ISBN 0-7167-0331-9, p. 347.

Londry, F.A. et al., "Mass-Selective Axial Ejection from a Linear Quadrupole Ion Trap," Journal of the American Society for Mass Spectrom. (2003), 14, 1130-1147, Eq. 20.

* cited by examiner

METHOD OF OPERATING TANDEM ION TRAPS

The present application claims benefit of and priority to co-pending U.S. patent application Ser. No. 12/480,160, filed on Jun. 8, 2009, entitled "Methods and Device to Analyze Large ion Populations In Linear Ion Traps (Tandem Ion Traps), which claims benefit of and priority to Provisional Application 61/059,962, filed Jun. 9, 2008, and Provisional Application 61/120,674, filed Dec. 8, 2008, the entire disclosures of which are herein incorporated by reference.

FIELD

The applicant's teachings relate generally to ion traps, and more particularly to tandem ion trap mass spectrometer configurations, and methods of operating the same.

INTRODUCTION

Conventional ion trap mass spectrometers, of the kind described in U.S. Pat. No. 2,939,952, can include three electrodes, namely a ring electrode, and a pair of end cap electrodes. Appropriate RF/DC voltages can be applied to the electrodes to establish a three dimensional field that traps ions within a specified mass-to-charge range. Linear quadrupoles may also be configurable as ion trap mass spectrometers, with radial ion confinement being provided by an applied RF voltage and axial ion confinement by DC potential barriers at each end of the rod set. Mass selective detection of ions trapped within a linear ion trap can utilize radial ejection of ions, as taught by U.S. Pat. No. 5,420,425, or axial ejection of ions (MSAE), as taught by U.S. Pat. No. 6,177,668. Fourier Transform techniques can also be utilized for in situ detection of ions, as taught by U.S. Pat. No. 4,755,670.

SUMMARY

In accordance with a first aspect of the applicant's teachings, there is provided a method of operating a tandem mass spectrometer system having a first ion trap and a second ion trap, the method comprising a) accumulating ions in the first ion trap at a first time; b) transmitting a first plurality of ions out of the first ion trap and into the second ion trap at a second time, the first plurality of ions having masses within a first mass range; c) retaining a second plurality of ions in the first ion trap at the second time, the second plurality of ions having masses within a second mass range different from the first mass range; d) transmitting the first plurality of ions out of the second ion trap at a third time; and, e) transmitting the second plurality of ions out of the first ion trap and into the second ion trap at the third time.

BRIEF DESCRIPTION OF THE DRAWINGS

A detailed description of various embodiments is provided herein below with reference to the following drawings, in which.

DESCRIPTION OF VARIOUS EMBODIMENTS

Figure 1:
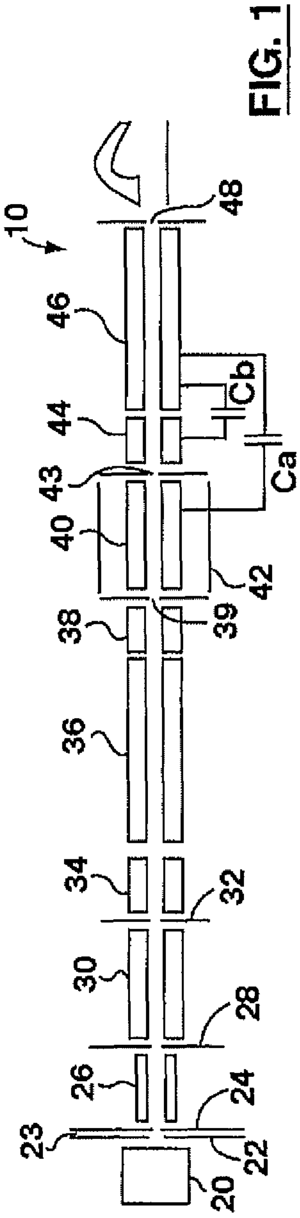
FIG. 1 is a block diagram illustrating a tandem linear ion trap mass spectrometer system that can be configured to implement a method according to an aspect of an embodiment of the present invention.

It will be understood by those skilled in the art that the drawings and associated descriptions to follow are intended to be exemplary in nature only and not to limit the scope of the present invention in any way. For convenience like reference numerals will be repeated where available to describe like features of the drawings.

The spectral resolution of ion trap mass spectrometers may depend on the density, or space charge, of trapped ions. Using conventional techniques, the spectral resolution of ion trap mass spectrometers may decline sharply once the space charge of the trapped ions reaches or exceeds a certain threshold level. In extreme cases, mass spectral peaks can be lost entirely due to space charge effects. Other undesirable space charge effects can include spontaneous emptying of the ion trap, shifts in mass calibration in the spectrometer and other forms of spectral distortion.

Reference is first made to FIG. 1, which is a block diagram illustrating a triple quadrupole mass spectrometer system 10 configured to implement a method according to an aspect of an embodiment of the present invention. The mass spectrometer system 10 comprises ion source 20, which generates and directs a focused ion stream toward curtain plate 22. In some embodiments the ion source 20 may be an ion spray or electrospray device, for example. Ions passing through an aperture in the curtain plate 22 can enter into curtain chamber 23, formed between curtain plate 22 and orifice plate 24. A flow of curtain gas into curtain chamber 23 can reduce the influx of unwanted neutral particles into the analyzing sections of mass spectrometer system 10. Ions can leave curtain chamber 23 through an aperture in orifice plate 24, passing through rod set 26 and entering into quadrupole rod set 30 by way of an aperture in interquad barrier 28. One function of quadrupole rod set 30 can be to collect and focus ions for transmission to downstream detection stages of mass spectrometer system 10. A secondary function of quadrupole rod set 30 can be further extraction of neutral particles from the ion stream that inadvertently passed through curtain chamber 23.

Ions collected and focused in quadrupole rod set 30 can exit through an aperture in interquad barrier 32 and pass through RF stubby rod set 34 (otherwise known as a Brubaker lens) into quadrupole rod set 36, which can be configured as a mass filter. As is known to those skilled in the art, a mass filter can be configured by applying a combination of quadrupolar RF and direct current (DC) potentials to a quadruple rod set that selectively stabilizes or destabilizes ions passing through the rod set. By controlling the amplitude and the ratio of the DC and RF potentials, it is possible to isolate ions having masses that fall inside of a range of interest for transmission to downstream detection stages, in that ions having masses that fall outside of the range of interest are destabilized and ejected. In this manner, quadrupole rod set 36 can substantially isolate a mass range of interest.

RF stubby rod set 38 guides ions ejected out of quadrupole rod set 36 into quadrupole rod set 40. Collision cell 42 encloses quadrupole rod set 40 and is maintained at a desired high pressure by pumping in a suitable collision gas, such as nitrogen or argon. Collision cell 42 also comprises entrance aperture 39 and exit aperture 43 for letting ions into and out of the collision cell 42, respectively. RF stubby rod set 44 guides ions exiting collision cell 42 through exit aperture 43 into quadrupole rod set 46, which can be maintained at a lower pressure than quadrupole rod set 40. Finally, ions ejected out of quadrupole rod set 46 pass through exit lens 48 for mass detection by a suitable detector.

It will be understood by those skilled in the art that the representation of FIG. 1 is schematic only. Additional elements may need to be assembled to complete the mass spectrometer system 10. For example, a plurality of power supplies might be used for delivering DC and RF voltages to different elements of the system, including quadrupole rod sets 36, 40, 46, exit aperture 43 and exit lens 48. In addition, a gas pump or other arrangement might be used to maintain different chambers of the system at desired pressure levels, including collision cell 42 as described. One or more ion detectors may also be provided. One or more coupling capacitors may also be provided.

In the mass spectrometer system 10 shown in FIG. 1, quadrupole rod set 40 can be configured as a first linear ion trap 40 by applying appropriate RF/DC containment voltages and AC excitation voltages, such that it can provide mass-selective axial ejection (MSAE) of ions as disclosed in U.S. Pat. No. 6,177,668. In like fashion, quadrupole rod set 46 can be configured as a second linear ion trap 46 also operable for MSAE. As mentioned previously, quadrupole rod set 36 can be configured as mass filter 36 for isolating a desired mass range of interest. Moreover, first and second linear ion traps 40, 46 can be coupled together using capacitor Ca, while second linear ion trap 46 can be coupled to RF stubby rod set 44 using Capacitor Cb.

Ions having masses falling within a mass range of interest can be selectively filtered by mass filter 36 and accumulated in first ion trap 40. For example, the masses of the accumulated ions fall within a mass range defined by a lower and an upper bound ion mass. Alternatively, the ions that are selected by the mass filter 36 can be transferred at high collision energy into collision cell 42. These ions may as a result be fragmented through collision with the collision gas molecules pumped into the collision cell 42. A delay period can be used to cool the fragmented ions formed through collision assisted dissociation (CAD) and trapped in linear ion trap 40. At the end of the delay period, first ion trap 40 can begin to transmit ions by way of RF stubby rod set 44 into second ion trap 46 using one of the techniques for MSAE taught by U.S. Pat. No. 6,177,668. Ions that are mass-selectively ejected out of first ion trap 40 can be accumulated and cooled in second ion trap 46. After another delay period ions can be ejected from linear ion trap 46 again using one of the MSAE techniques taught by U.S. Pat. No. 6,177,668. In this fashion, first and second ion traps 40, 46 can be operated in tandem.

Multiple different techniques for MSAE are known. One such method involves providing a constant DC trapping field and then providing an additional auxiliary AC field to the downstream end of the ion trap. That is, a DC trapping field can be created at the downstream end of the ion trap by applying a DC offset voltage that is higher than the DC offset voltage applied to the quadrupole rods of the ion trap. With these DC voltages so applied, ions that are stable within the radial RF containment field can encounter the DC potential barrier created at the downstream end of the ion trap and be axially trapped as well. In the configuration of FIG. 1, for example, the requisite DC potential barrier can be created in first linear ion trap 40 by providing the appropriate DC offset voltage in the vicinity of exit aperture 43, and likewise in second linear ion trap 46 by providing the appropriate DC offset voltage to exit lens 48.

Ions clustered around the centre of the ion trap can experience RF containment fields that are near perfectly quadrupolar. However, ions in the vicinity of the downstream end can experience imperfectly quadrupolar fields on account of the RF/DC fields terminating at the end of the quadrupole rod set. These imperfect fields (commonly referred to as "fringing fields") tend to couple the radial and axial components of motion of the trapped ions. In other words, the trapped ions' radial and axial components of motion may cease to be essentially mutually orthogonal, unlike the ions clustered around the centre of the ion trap that have essentially uncoupled, or only very loosely coupled, components of motion. Because of the fringing fields formed near the downstream end of the ion trap, ions in the vicinity can be mass-dependently scanned out of the ion trap by application of a low voltage auxiliary AC field of the appropriate frequency. The applied auxiliary AC field couples to both the radial and axial secular ion motions. By absorbing energy from the auxiliary AC field, ions can become sufficiently excited such that that they are able to overcome the DC potential barrier formed at the downstream end of the ion trap. Ions not sufficiently excited by the auxiliary AC field can remain contained in the ion trap until the frequency of the auxiliary AC field is changed to match their secular frequency, at which point they too can be mass-selectively ejected out of the ion trap.

Other techniques for mass-selective axial ejection of ions can also be implemented on a linear quadrupole rod set. For example, rather than scanning the frequency of the auxiliary AC field provided to the exit aperture, the amplitude of the main RF containment field provided to the quadrupole rods can instead be scanned. A q value of only about 0.2 to 0.3 can be used for axial ejection, which is well below the q value of about 0.907 typically used for radial ejection. Thus, few if any ions may be lost due to radial ejection when the amplitude of the main RF voltage is scanned. As described with reference to the drawings, mass spectrometer system 10 can mass-selectively eject ions by scanning the main RF containment field over a range of amplitudes. Of course, it will be appreciated by those skilled in the art that mass spectrometer system 10 can be adapted or reconfigured for other MSAE techniques without limiting the scope of the present invention. It will also be appreciated by those skilled in the art that different MSAE techniques can be used in combination. For example, the amplitude of the RF containment voltage can be scanned in combination with scanning of the applied auxiliary AC excitation field frequency. Alternatively, other ion traps involving axial transmission can be used such as, for example, those described in U.S. Pat. No. 5,783,824 and U.S. Patent Publication No. 2005/0269504 A1.

Figure 2A:
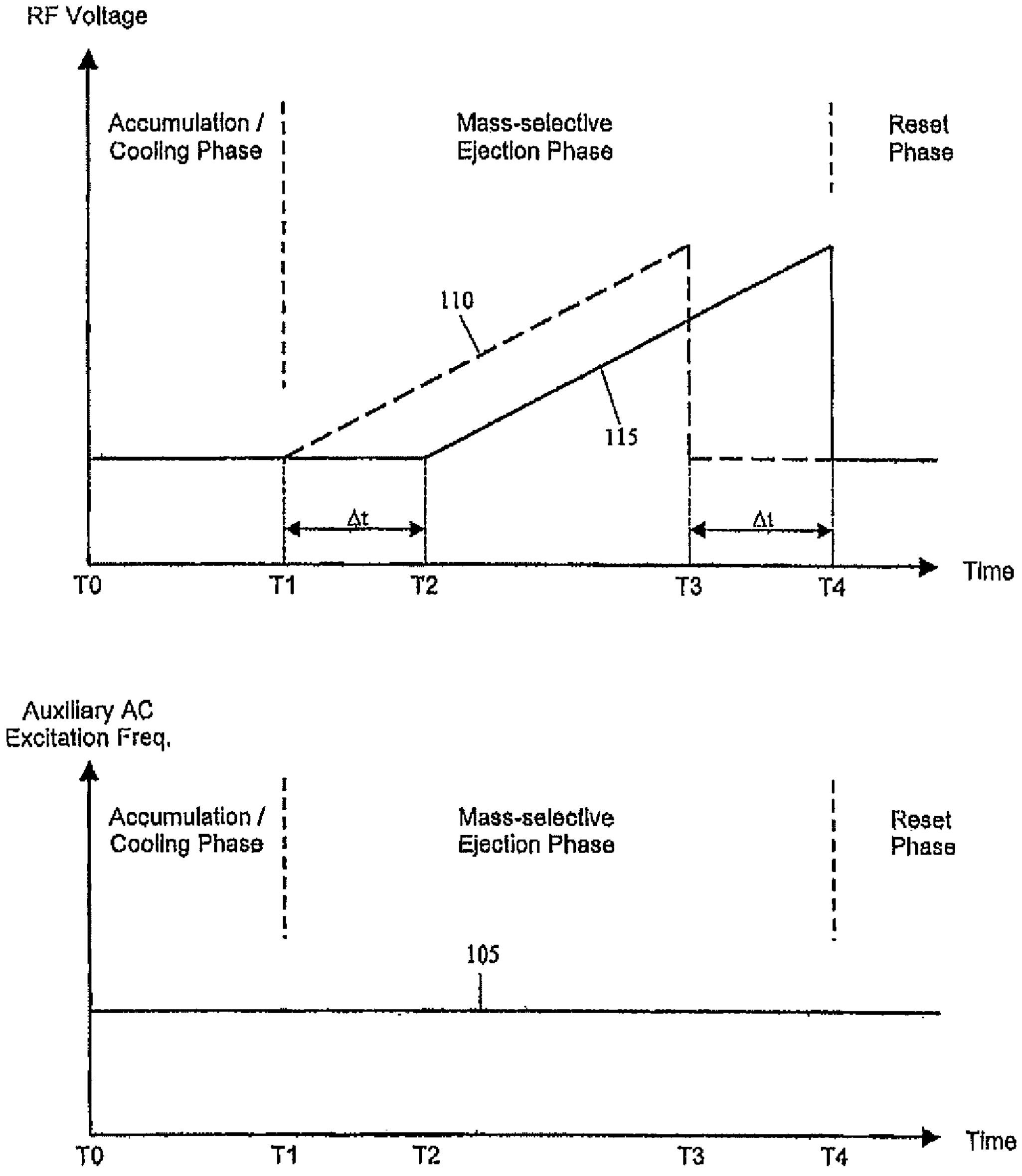
FIG. 2A is a timing diagram of exemplary RF voltage and auxiliary AC excitation frequency waveforms suitable for mass-selective axial ejection of ions when the applied auxiliary AC excitation frequency is held constant according to an aspect of an embodiment of the present invention.

Reference is now made to FIG. 2A, which illustrates exemplary RF voltage and auxiliary AC excitation frequency waveforms suitable for mass-selective axial ejection of ions for first and second ion traps 40, 46 in mass spectrometer system 10. Waveform 110 represents the RF containment voltage applied to first ion trap 40, while waveform 115 represents the RF containment voltage applied to second ion trap 46. Accordingly, waveforms 110, 115 may be suitable for MSAE in which the amplitude of the RF containment voltage is scanned and the frequency of the applied auxiliary AC excitation field is held constant (represented by constant line 105). Waveforms 110, 115 may also be provided independently to first and second ion traps 40, 46 by one or more voltage sources (not shown).

As illustrated, both waveforms 110, 115 can comprise an accumulation/cooling phase, wherein the applied RF voltage is constant, followed by a mass-selective ejection phase, wherein the applied RF voltage is linearly scanned. Waveforms 110, 115 can also comprise a reset phase, wherein the applied RF containment voltages can be reset to their pre-scan levels and stray ions still trapped in the mass spectrometer system 10 can be evacuated by lowering the DC trapping barriers in the first and second ion traps 40,46. Waveform 115 can be time-delayed relative to waveform 110 by a delay time interval Δt, as shown in FIG. 2A and discussed further below.

Figure 3:
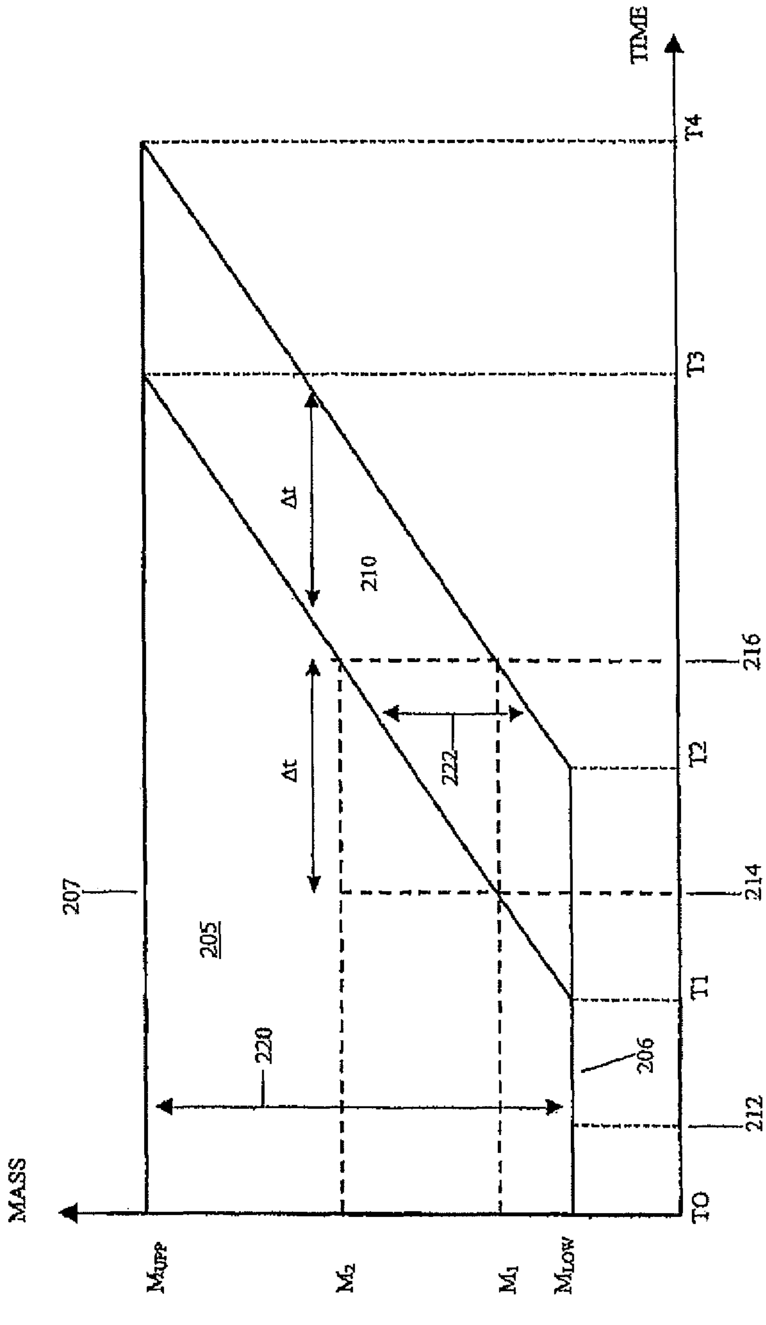
FIG. 3 is a timing diagram of starting and operating mass ranges for two linear ions traps operated in tandem according to an aspect of an embodiment of the present invention.

Ions filtered by mass filter 36 can be transmitted into first ion trap 40 starting at time T0 wherein they can be accumulated and cooled until time T1. The mass range of ions that accumulate in first ion trap 40 between times T0 and T1 can be referred to as the starting mass range 220 of first ion trap 40, as shown in FIG. 3. At time T1, ions can begin to be mass-selectively scanned out of the first ion trap 40 into the second ion trap 46 at a first scan rate, defined in units of Daltons per second (Da/s). The slope of waveform 110 during the mass-selective ejection phase represents this first scan rate. For example, ions can be scanned out at a rate of 1000 Da/s, such that after 25 ms of scanning, a 25 Da mass range will have accumulated in second ion trap 46. After a delay time interval, Δt in FIG. 2A, ions accumulated in the second ion trap 46 can begin to be mass-selectively scanned at a second scan rate. As shown in FIG. 2A, scanning of the first ion trap 40 commences at T1 and concludes at T3, while scanning of the second ion trap 46 commences at T2 and concludes at T4. The reset phase then begins at the end of the mass-selective ejection phase.

By setting the second scan rate to substantially equal the first scan rate, the rate of ions entering the second ion trap 40 can be kept substantially equal to the rate of ions ejected from it. Thus, over an operating time interval of mass spectrometer system 10, the mass range of ions trapped in the second ion trap 46 can substantially equal the ion mass range that initially accumulated in the second ion trap 46 during the delay time interval Δt between times T1 and T2. This mass range can be referred to as the variable operating mass range 222 of the second ion trap 46. In other words, over the operating time interval of the mass spectrometer system 10, the mass range of the second ion trap may approximately equal the scan rate of the first ion trap 40 (1000 Da/s in the example) multiplied by the delay time interval Δt between times T1 and T2 (25 ms in the example).

If ions are scanned out of second ion trap 46 at substantially the same scan rate as the scan rate of the first ion trap 40, only time-delayed by the delay time interval Δt, then the variable operating mass range 222 of the second ion trap 46 can be set narrower than the starting mass range 220 of the first ion trap 40 by selecting the appropriate delay time interval Δt. Again in terms of the above example, at any point after the 25 ms delay time interval, the ions in the second ion trap 46 may have a mass range of approximately 25 Da. Thus, if the starting mass range 220 of the first ion trap 40 is 1000 Da, then the variable operating mass range 222 of the second ion trap 46 may be only approximately 2.5% of the starting mass range of first ion trap 46. If the starting mass range 220 of the first ion trap 40 were 500 Da instead, then the variable operating mass range 222 of the second ion trap 46 may be only approximately 5% of the starting mass range 222 of the first ion trap 40. By having a narrower ion mass range during the operating time interval of the mass spectrometer system 10, the second ion trap 46 may be less susceptible to space charge effects relative to the first ion trap 40. As a result ions can be scanned out of second ion trap 46 with higher resolution than they otherwise could have been scanned out of first ion trap 40. Being less susceptible to space charge effects, the second ion trap 46 may also have a shorter length, relative to first ion trap 40, in alternative embodiments of the present invention.

As described above, waveforms 110, 115 may be suitable for MSAE in which the amplitude of the RF containment voltage is scanned and the frequency of the applied auxiliary AC field is held constant. As it will be appreciated by those skilled in the art, the Mathieu q-value for a linear quadrupole ion trap may be given by:

$$q = \frac{4\ eV}{m r_0^2 \Omega^2}, \tag{1}$$

where m and e are the ion mass and charge, respectively, $r_0$ is the field radius of the quadrupole trap, Ω is the angular drive frequency of the quadupole, and V is the amplitude of the RF radial containment field measured pole to ground. Also, ion fundamental resonant frequency can be represented by:

$$\omega = (2n + \beta)\frac{\Omega}{2}, \tag{2}$$

which, by setting n=0 and using the relationship defined in equation 1, can be re-written as:

$$\omega \approx \frac{q\Omega}{\sqrt{8}}, \quad (3)$$

for $q < 0.4$.

Alternatively, equation 3 can be expressed explicitly in terms of the frequency of the applied auxiliary AC field, ω, and the RF amplitude of the radial containment field, V as:

$$\frac{\omega}{V} \approx \frac{\sqrt{2}\,e}{m r_0^2 \Omega}, \quad (4)$$

for $q < 0.4$.

Resonant excitation of an ion occurs when the frequency of the auxiliary AC field applied to the quadruple coincides with the ion fundamental resonant frequency, ω. Thus, it will be appreciated how equation 4 may define an overall relationship, for each ion trap 40, 46, between the frequency of the applied auxiliary AC field, equal to ω, and the RF amplitude of the radial containment field, V, that results in resonant excitation of ions having mass, m, and charge, e, trapped in a quadrupole field of radius, $r_0$, and drive frequency, Ω. This overall relationship, moreover, may be used as part of a control system for first and second ion traps 40, 46. In particular, if the same auxiliary AC field is applied to each ion trap 40, 46, then resonant excitation of ions may occur for the same applied RF amplitude, V. As illustrated by waveform 105 in FIG. 2A, the auxiliary AC excitation frequency applied to each of first and second ion traps 40, 46 may be constant and equal. In that case, controlling the rate at which the RF amplitudes for first and second ion traps 40, 46 are scanned, therefore, may provide a way of controlling the times at which ions of particular masses and charges are ejected. For example, the RF amplitude of the second ion trap 46 may be scanned at the same rate as the RF amplitude of the first ion trap 40, only time-delayed by the delay time interval, as seen in waveforms 110, 115. These waveforms may also be provided independently to first and second ion traps 40, 46 by one or more voltage sources. The selected delay-time interval may also substantially correspond to a cooling time of the ions.

Figure 2B:
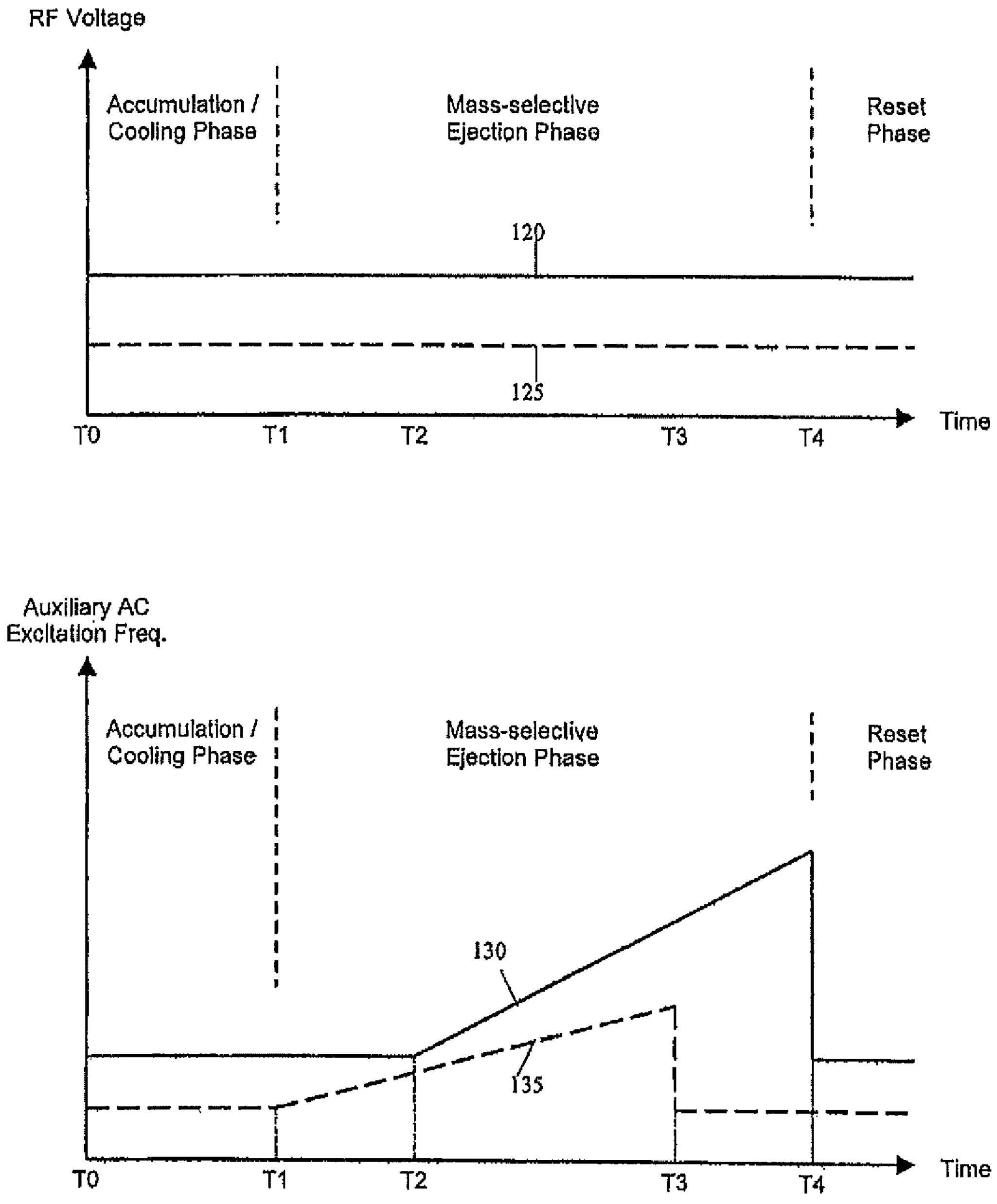
FIG. 2B is a timing diagram of exemplary RF voltage and auxiliary AC excitation frequency waveforms suitable for mass-selective axial ejection of ions according to an aspect of an embodiment of the present invention.

Reference is now made to FIG. 2B, which illustrates exemplary RF voltage and auxiliary AC excitation frequency waveforms suitable for mass-selective axial ejection of ions for first and second ion traps 40, 46 in mass spectrometer system 10 according to an aspect of an alternative embodiment of the present invention. In this alternate embodiment, MSAE of ions may be provided using constant RF containment fields, and by scanning the frequency of the auxiliary AC excitation fields applied to first and second ion traps 40, 46. Waveform 120 in FIG. 2B represents the amplitude of the RF containment field applied to second ion trap 46, while waveform 125 represents the amplitude of the RF containment field applied to first ion trap 40. As illustrated, waveforms 120 and 125 have different amplitudes, but they may also have the same amplitude. The RF containment voltages may be provided independently by one or more voltage sources or using capacitive coupling, as described below. In general, waveforms for the first ion trap are represented using a dashed line, while waveforms for the second ion trap are represented using a solid line.

Waveforms 130 and 135 represent the auxiliary AC frequency waveforms that may be suitable for MSAE of ions. Waveform 130 represents the frequency of the auxiliary AC excitation field applied to second ion trap 46, while waveform 135 represents the frequency of the auxiliary AC excitation field applied to first ion trap 40. As illustrated, waveform 130 is a scaled and time-delayed version of waveform 135 during the mass-selective ejection phase. That is, waveform 130 is time-delayed by the delay time interval and scaled, according to equation 4, in the same proportion as waveforms 120 and 125 are scaled. By setting this particular relationship between waveforms 130 and 135, ions of a certain mass ejected out of first ion trap 40, into second ion trap 46, may then also be ejected from second ion trap 46 after having been cooled in second ion trap 46 for a period of time equal to the delay time interval Δt.

Figure 2C:
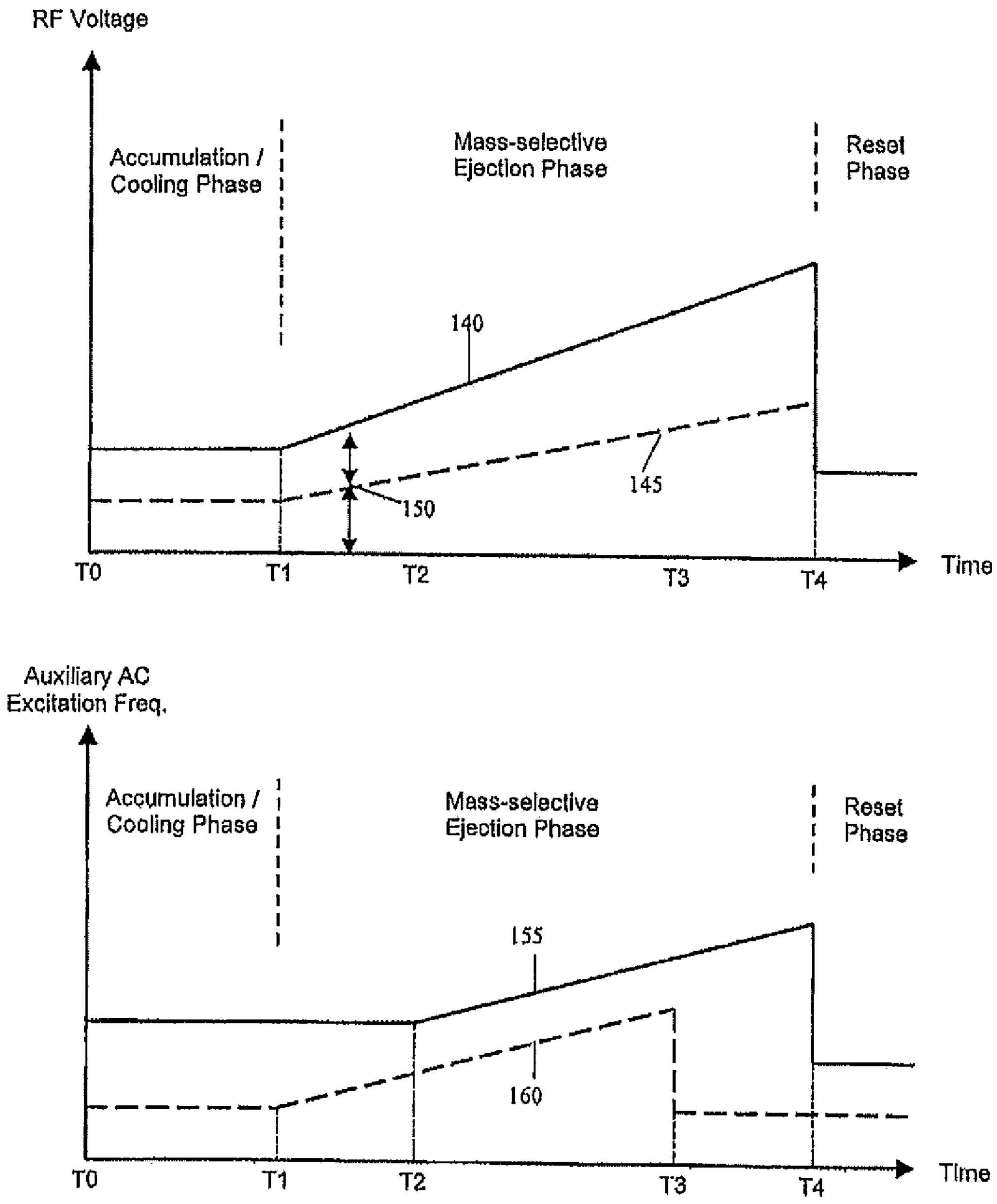
FIG. 2C is a timing diagram of exemplary RF voltage and auxiliary AC excitation frequency waveforms suitable for mass-selective axial ejection of ions according to an aspect of an embodiment of the present invention.

Reference is now made to FIG. 2C, which illustrates exemplary RF voltage and auxiliary AC excitation frequency waveforms suitable for mass-selective axial ejection of ions for first and second ion traps 40, 46 in mass spectrometer system 10 according to an aspect of an alternate embodiment of the present invention. Waveform 140 represents the RF containment voltage applied to second ion trap 46, while waveform 145 represents the RF containment voltage applied to first ion trap 40. Similar to waveforms 110, 115 shown in FIG. 2A, waveforms 140, 145 each comprise an accumulation/cooling phase, a mass-selective ejection phase and a reset phase. The ratio 150 of the amplitude of waveform 140 to the amplitude of waveform 145 can be substantially constant over an operating time interval, for example between times T0 and T4.

Waveforms 140, 145 may represent RF containment voltages suitable for MSAE of ions in which, as is known from U.S. Pat. No. 6,177,668, the frequency of the applied auxiliary AC field is scanned in addition to the amplitude of the ion trap RF containment voltage. As illustrated, the amplitudes of waveforms 140, 145 may be scanned, not at the same rate, but in approximately the same proportion. That is, the ratio 150 of the amplitudes may be substantially fixed.

Waveforms 140, 145 may be applied independently to second and first ion traps 46, 40 by one or more voltage sources, but waveforms 140, 145 may also be applied using capacitive coupling between first and second ion traps 40, 46. For example, as illustrated in FIG. 1, capacitor Ca may couple first ion trap 40 with second ion trap 46, and capacitor Cb may couple second ion trap 46 with RF stubby 44. Together with additional circuit elements as may be needed, capacitors Ca and Cb set up an AC voltage divider between first and second ion traps 40, 46. Accordingly, as is known, the ratio 150 can be selected by selecting appropriate values for Ca and Cb. For example, the ratio 150 of waveform 140 to waveform 145, representing the amplitudes of the RF containment voltages applied to second and first ion traps 46, 40, respectively, may be approximately equal to 2 over an operating interval of the mass spectrometer 10.

According to equation 1, assuming that first and second ion traps have the same quadrupole field radius, $r_0$, the q value of the first ion trap 40 will be approximately half of the q value of second ion trap 40 for a ratio 150 approximately equal to 2. Similarly, according to equation 3, the ion fundamental resonant frequency, ω, of the first ion trap 40 will be approximately half that of the second ion trap 46. So, for example, if second ion trap 46 is operated at q=0.846 over the operating interval, then the auxiliary AC excitation frequency applied to first ion trap 40 may correspond to some value q<0.423. The relationship is expressed as an inequality to reflect the fact that ions of a certain mass may be excited out of second ion trap 46 some delay time interval after they are ejected out of first ion trap 40 (and into second ion trap 46). Controlling the delay time interval may be accomplished by controlling the auxiliary excitation frequency, ω, applied to the first ion trap 40. The lower the q value at which ions may be ejected from first ion trap 40, the lower the excitation frequency, ω, and correspondingly the bigger the delay time interval. That delay time interval, again, may correspond to a cooling time of the ions.

Stated in slightly different terms, for each of first and second ion traps 40, 46, equation 4 may provide an overall relationship, between the RF amplitudes, $V_1$, $V_2$ and the auxiliary AC excitation frequencies, $\omega_1$, $\omega_2$. Given RF amplitudes V1, V2, for example as represented by waveforms 145, 140, respectively, equation 4 therefore provides auxiliary excitation frequencies $\omega_1$, $\omega_2$ suitable for MSAE of ions. Waveforms 155 and 160, for example, illustrate exemplary auxiliary AC excitation frequencies, as a function of time, suitable for MSAE of ions. In particular, $\omega_1$, $\omega_2$ may be scanned such that, over a mass range of ions and an operating interval of mass spectrometer 10, ions are ejected out of second ion trap 46 a delay time interval after being ejected out of first ion trap 10 (and into second ion trap 46). As illustrated by waveform 160, the auxiliary AC excitation frequency for first ion trap 40 may be selected to scan linearly during the mass-selective ejection phase of first ion trap 40, as defined by line times T1 and T3. Equation 4 may then provide a means of determining how to scan the auxiliary AC excitation frequency for second ion trap 46, illustrated by waveform 155. In such a case, the scan rate of second ion trap may be non-linear. During times T1 and T2, when second ion trap 46 is accumulating ions ejected from first ion trap 40, the auxiliary AC excitation frequency may, according to equation 4, be any value such that, given the amplitude of the RF containment field applied to second ion trap 46, the fringing fields in second ion trap 46 do not cause any appreciable resonant excitation of ions until at least time T2. At time T2, however, when second ion trap 46 may commence MSAE of ions, then the value of the auxiliary AC excitation frequency may be controlled for MSAE, again according to equation 4, for example. When first and second ion traps 40, 46 are operated such that both RF amplitude and auxiliary AC excitation frequency are scanned, then scanning of $\omega_1$, $\omega_2$ can be thought of as serving a compensatory function to correct for the different, though proportionate, scan rates of $V_1$, $V_2$, and which, without this compensatory function, would result in different ion ejection rates for first and second ion traps 40, 46. Again, as described previously, the delay time interval may correspond to a cooling time of ions.

Reference is now made to FIG. 3, which shows examples of ion mass ranges for first and second ion traps 40, 46 when excited using RF voltage waveforms such as those shown in FIGS. 2A-2C. Region 205 represents the mass range of ions trapped in first ion trap 40 as a function of time. Similarly, region 210 represents the mass range of ions trapped in second ion trap 46 as a function of time. FIG. 3 is not necessarily drawn to scale and is figurative only. As illustrated, region 205 has a starting mass range 220 defined by a lower and upper bound mass ($M_{LOW}$ and $M_{UPP}$ respectively). As shown, region 205 is bounded vertically by horizontal lines 206 and 207 at $M_{LOW}$ and $M_{UPP}$ respectively, on the left by the Y axis at time T0, and on the right by a sloping 208 line extending from (T1, $M_{LOW}$) to (T3, $M_{UPP}$). During the accumulation/cooling phase, i.e. between times T0 and T1, the mass range of first ion trap 40 remains substantially constant at the starting mass range 220. However, as ions begin to be mass-selectively scanned out of first ion trap 40 starting at time T1, the mass range of trapped ions begins to narrow over time. As the amplitude of waveform 110 is scanned, ions of increasingly greater mass are ejected out of first ion trap 40 until time T3 by which point no or only a negligible number of ions may remain in first ion trap 40.

In the second ion trap, initially (before time T1) there may be no or only a negligible number of ions because scanning of ions out of first ion trap 40 has not yet commenced. But during the delay time interval Δt between times T1 and T2, ions of increasingly greater mass, i.e. those ejected out of first ion trap 40, can be accumulated until second ion trap 46 reaches its operating mass range 222 at time T2. At that point, since the injection and ejection rates of second ion trap 46 can be approximately equal, the range of ion masses trapped in second ion trap 46 can remain substantially constant, though the ion masses themselves can increase over time. By time T3 first ion trap 40 has ejected all or substantially all the ions trapped within it, at which point the mass range of ions trapped in second ion trap 46 can begin to narrow, as shown in FIG. 3, until eventually all or substantially all the ions can be ejected from second ion trap 46, which occurs at time T4. As shown in FIG. 3, and as can be inferred from what is described above, the region 210 has a lower bound defined by horizontal line 206 extending from (T1, $M_{LOW}$) to (T2, $M_{LOW}$), and is bounded at its upper end by horizontal line 207 extending from (T3, $M_{UPP}$) to (T4, $M_{UPP}$). Region 210 is also bounded on the left by the sloped line 208 extending from (T1, $M_{LOW}$) to (T3, $M_{UPP}$), and is bounded on the right by a sloped line 209 extending from (T2, $M_{LOW}$) to (T4, $M_{UPP}$).

The main RF containment voltage and/or auxiliary AC excitation frequency, depending as the case may be on how mass-selective axial ejection is being implemented, may be either continuously or discontinuously scanned. Where the voltage is continuously scanned it may be either linearly or non-linearly scanned. Different RF/AC voltage waveforms are suitable for this purpose. FIGS. 2A-2C illustrate RF pairs of voltage waveforms 110 and 115, 120 and 125, and 140 and 145, respectively, that may be suitable for continuous and linear scanning of ions. FIG. 3 may then represent the resulting mass ranges for first and second ion traps 40, 46, according to any of these applied RF/AC voltages. It will be appreciated that, as described above, the auxiliary AC excitation frequencies for first and second ion traps 40, 46 may be scanned in addition to the RF containment voltages according to aspects of some embodiments of the present invention. Waveforms 140, 145 in FIG. 2C may represent those RF containment voltages. It may also be the case that only the auxiliary AC excitation frequencies are scanned, as illustrated by waveforms 130, 135 in FIG. 2B. Finally, it will also be appreciated that other RF/AC voltage waveforms can be suitable according to alternative embodiments of the present invention, which can produce different resulting mass ranges.

Referring again to FIG. 2A, as discussed previously, ions can be scanned out of first and second ion traps 40, 46 using mass selection axial ejection techniques as taught, for example, in U.S. Pat. No. 6,177,668. To operate first and second ion traps 40, 46 for tandem MSAE, the main RF containment voltages applied to the first and second ion traps 40, 46 can be scanned in tandem. In particular, the RF voltage 115 applied to the second ion trap 46 can substantially correspond to the RF voltage 110 applied to the first ion trap 40 only time-delayed by a delay time interval Δt, such that mass-selection ion ejection in the second ion trap 46 lags behind mass-selective ion ejection in the first ion trap 40 by that delay time interval Δt. For this purpose, independent RF voltages can be applied to first and second ion traps 40, 46 using separate power supplies.

Alternatively, RF containment voltages can be applied to first and second ion traps 40, 46 using one or more coupling capacitors, such as those illustrated in FIG. 1. In these configurations of mass spectrometer 10, capacitance values can be chosen to establish different proportions between the RF containment voltages applied to first and second ion traps 40, 46. FIGS. 2B and 2C illustrate suitable pairs of waveforms 120, 125 and 140, 145. By selecting values for coupling capacitors Ca, Cb, and controlling the applied RF containment and auxiliary AC excitation frequencies applied to first and second ion traps 40, 46, over a mass range of ions and an operating time interval of the mass spectrometer 10, ions of a certain mass can be ejected from second ion trap 46 a delay-time interval after being ejected out of first ion trap 40. The delay time interval moreover can be chosen to substantially correspond to the cooling time of ions accumulated in second ion trap 46, which in turn depends on characteristics of the ions (mass, initial energy, etc.) as well as characteristics of the ion trap (volume, pressure, etc.) The delay-time interval could be greater than the cooling time of the ions, but doing so reduces the duty cycle of the mass spectrometer system and thus may generally be undesirable.

Various aspects of embodiments of the present invention are described below with reference to FIGS. 2A-2C and 3. A method of operating a tandem mass spectrometer system can be described by reference to the state of the mass spectrometers or the ion traps included in the system at different times. For example, at a first time, between T0 and T1, ions can be accumulated in the first ion trap 40. Then, at a second time, at any time between T1 and T3 as shown in FIGS. 2A and 3, a first plurality of ions can be transmitted from the first ion trap 40 and into the second ion trap 46. The first plurality of ions would have masses within a first mass range. Also at this second time, a second plurality of ions could be retained in the first ion trap 40. The second plurality of ions would have masses within a second mass range different from the first mass range. Now consider a third time, after the second time somewhere between T2 and T3 shown in FIGS. 2A and 3. During this third time, the first plurality of ions could be transmitted out of the second ion trap 46, while the second plurality of ions could be transmitted from the first ion trap 40 into the second ion trap 46.

The foregoing description can be seen as a series of three snapshots taken at three different times throughout a method in accordance with an aspect of an embodiment of the present invention. For clarity, this description is repeated with specific reference to FIG. 3, in which the first time, second time and third time are designated using reference numerals 212, 214 and 216 respectively. Specifically, as shown, at the first time 212, ions are accumulating in the first ion trap 40. Alternatively, ions may have been accumulating in the first ion trap before time T0. Then, at a second time 214, a first plurality of ions having a mass range defined by upper bound $M_1$ can be transmitted from the first ion trap 40 to the second ion trap 46, while a second plurality of ions, having a second mass range from just above $M_1$ to $M_2$ can be retained in the first ion trap. Note that, as illustrated in FIG. 3, second time 214 falls between T1 and T2 though it may also fall between T2 and T3. At a third time 216, the first plurality of ions, having a maximum mass $M_1$, can now be ejected from the second ion trap 46, while the second plurality of ions, having a mass range between just above $M_1$ and $M_2$, can be transmitted from the first ion trap 40 to the second ion trap 46.

The foregoing description can be seen as a series of snapshots of a method in accordance with an aspect of the present invention at different times. As described above, it can be advantageous to maintain a much higher first space charge density in the first ion trap 40 at the second time 214 relative to the second space charge density in the second ion trap 46 at the second time 214. Where, as described above, the second time 214 is close to T1, the first space charge density may be 5, 10, or 20 times the second space charge density. Of course, as the second time 214 moves from T1 toward T3, the relative difference in the space charge densities of the first and second ion traps 40, 46 may well diminish.

While some aspects of embodiments of the present invention can perhaps be better described through a series of snapshots, other aspects of embodiments of the present invention are perhaps better described by using a more dynamic vocabulary to describe how the method operates over time analogous to, say, a video, rather than a series of snapshots. As shown in FIG. 3, the variable operating mass range 222 between lines 208 and 209, for operating times falling between T1 and T3, can be seen as an instance of a first sliding transmission window having an upper bound defined by the height of line 208. The upper bound of the first sliding transmission window is related to the RF voltage and auxiliary AC excitation frequency applied to the first ion trap 40 for MSAE. In particular, according to equations 1 and 3, for a given RF voltage level and auxiliary AC excitation frequency, the upper bound of the first sliding transmission window may define the heaviest ion mass that will, for that RF voltage level and auxiliary AC excitation frequency, be sufficiently excited for MSAE out of the first ion trap 40. As the RF voltage level is scanned, according to aspects of some embodiments of the present invention, the upper bound of the first sliding transmission window increases. Thus, between T1 and T3, over which the RF voltage waveform 110 is scanned, the upper bound of the first sliding transmission window will change. In particular, as shown in FIG. 3, at the second time 214, the first sliding transmission window will have an upper bound at $M_1$, while at the third time 216, the first sliding transmission window will have an upper bound at $M_2$. In other embodiments, the auxiliary AC excitation frequency applied to first ion trap 40 is also scanned between T1 and T3 as the upper bound of the first sliding transmission window changes.

Similarly, consider a second sliding transmission window representing those ions that are transmitted out of the second ion trap 46. As with the first sliding transmission window, the upper bound of the second sliding transmission window, represented by sloped line 209, will change over time as the amplitude of RF voltage waveform 115 is scanned between T2 and T4. Thus, until the third time 216, the second ion trap 46 would be operable to retain the first plurality of ions having a mass of at least $M_1$; however, at the third time 216, the upper bound of the second sliding transmission window will reach ions of mass $M_1$, such that these ions can now be ejected from the second ion trap 46. As with the first sliding transmission window, according to aspects of some embodiments of the present invention, the RF voltage waveform 115 is scanned between T2 and T4, while in other embodiments the auxiliary AC excitation frequency applied to second ion trap 46 is also scanned.

As shown in FIG. 3, the first variable mass range covered by the first sliding transmission window and the second variable mass range covered by the second sliding transmission window can be linearly scanned at substantially the same rate. Over an operating time interval from T2 to T3, for example, the second sliding transmission window can be time-delayed relative to the first sliding transmission window by a delay time interval, shown as Δt in FIG. 3, such that the first variable mass range at any operating time during the operating time interval can substantially correspond to the second variable mass range at the operating time plus the delay time interval Δt. For example, as shown in FIG. 3, the points at which a horizontal line representing $M_1$ intersects slope lines 208 and 209 are separated by approximately Δt. In some embodiments, as shown, the first scan rate represented by the slope of line 208, can substantially equal the second scan rate, represented by the slope of line 209.

Optionally, a second space charge level can be selected for the second ion trap 46, and a cooling time interval selected for retaining ions in the second ion trap 46 to provide the second space charge level. In that case, the delay time interval Δt may substantially equal the cooling time interval.

As described above, the first scan rate can be represented in FIG. 3 by a slope of line 208. Multiplying this slope by the delay time interval Δt, can yield the vertical distance between lines 208 and 209 at any point between T2 and T3, assuming, of course, that the slopes 208 and 209 are equal (in other words, that the scan rates of the first ion trap 40 and the second ion trap 46 are equal). This vertical difference is, of course, the variable operating mass range 222 of second ion trap 46. Optionally, to improve resolution and reduce the space charge problems, this variable operating mass range 222 can be kept relatively small as compared to the starting mass range 220. For example, it can be less than half of the starting mass range 220, or even less than the fifth or a tenth of the starting mass range 220.

According to some embodiments of the present invention, the first ion trap and the second ion trap can be capacitively coupled. In some such embodiments, the first scan rate from the first ion trap can be controlled by adjusting the first RF voltage and the first auxiliary AC voltage provided to the first ion trap. Then, as a result of the capacitive coupling, a second RF voltage can be automatically applied to the second ion trap. Again, as a result of the capacitive coupling, the ratio of the first RF voltage applied to the first ion trap and the second RF voltage applied to the second ion trap can be kept substantially constant over the operating time of tandem ion traps. Specifically, the ratio of the first RF voltage and the second RF voltage can be controlled by selecting the capacitances of the one or more coupling capacitors.

As described above, it can be desirable for the first scan rate from the first ion trap to equal the second scan rate from the second ion trap. To provide this in embodiments in which the ion traps are capacitatively coupled, the first auxiliary AC voltage applied to the first ion trap and the second auxiliary AC voltage applied to the second trap can be determined based on the ratio of the first RF voltage to the second RF voltage such that the first scan rate substantially equals the second scan rate. Of course, according to other embodiments, as described above, the first RF voltage and the second RF voltage can be independently provided to the first and second ion traps respectively.

Reference is now made to FIGS. 4-7, which are block diagrams illustrating different possible configurations of a triple quadrupole mass spectrometer system according to alternative embodiments of the present invention. These alternative embodiments function in the same or a similar manner to mass spectrometer system 10 illustrated in FIG. 1. Accordingly, only differences in the alternative embodiments will be explained in detail. For clarity, elements of the alternative embodiments illustrated in FIGS. 4-7 are designated using the reference numerals used to designate similar or analogous elements in the mass spectrometer system 10 of FIG. 1.

Figure 4:
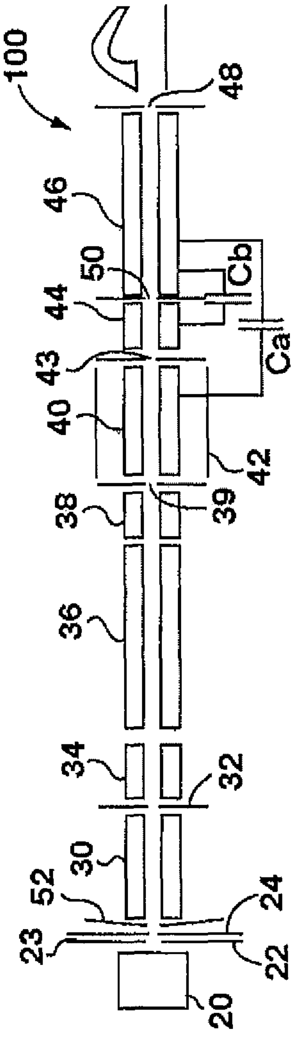
FIG. 4 is a block diagram illustrating a tandem linear ion trap mass spectrometer system that can be configured to implement a method according to an aspect of an alternative embodiment of the present invention.

FIG. 4 illustrates a block diagram of mass spectrometer system 100 configured according to an alternative embodiment of the present invention. Mass spectrometer system 100 comprises skimmer plate 52 instead of quadrupole rod set 26 and interquad barrier 28, both of which are included in mass spectrometer system 10. Ions exiting curtain chamber 23 through the aperture in orifice plate 24 pass through skimmer plate 52 into quadrupole rod set 30. Mass spectrometer system 100 also comprises additional interquad barrier 50.

Triple quadrupole mass spectrometer system 100 is operated as a tandem linear ion trap mass spectrometer by configuring RF stubby 44 to act as a first ion trap and quadrupole rod set 46 to act as a second ion trap. Indeed additional interquad barrier 50 is included in mass spectrometer system 100 as one possible configuration for setting up a DC trapping field in RF stubby 44. An auxiliary AC field can also be provided to interquad barrier 50. Optionally, the frequency of the applied auxiliary AC field can be scanned if that mode of MSAE is being implemented. Otherwise interquad barrier 50 can receives a DC potential and substantially constant auxiliary AC excitation frequency, while the main RF containment voltage applied to the quadrupole rods of RF stubby 44 can be scanned to provide MSAE of ions. In mass spectrometer system 100, collision cell 40 can be maintained at a relatively high pressure to assist with ion cooling, though first and second ion traps 44, 46 can both maintained at low pressure. For example, the operating pressure in collision cell 40 can be maintained between $5\times10^{-5}$ Torr and 20 mTorr, while the operating pressure in ion traps 44, 46 can be maintained between $6\times10^{-6}$ Torr and $5\times10^{-4}$ Torr. Also, coupling capacitors Ca, Cb can be utilized as part of a voltage divider for setting the ratio of RF containment voltages applied to first and second ion traps 44, 46, which, together with appropriate scanning of applied auxiliary AC excitation frequencies, can provide tandem MSAE of ions out of first and second ion traps 44, 46 according to aspects of some embodiments of the present invention.

Figure 5:
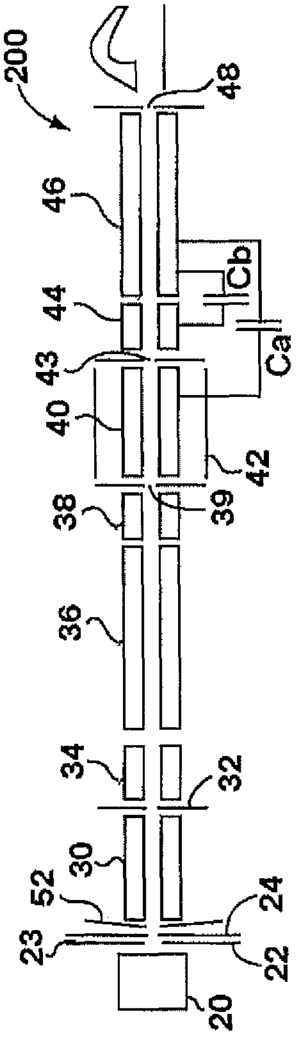
FIG. 5 is a block diagram illustrating a tandem linear ion trap mass spectrometer system that can be configured to implement a method according to an aspect of an alternative embodiment of the present invention.

FIG. 5 illustrates a block diagram of mass spectrometer system 200 configured according to an alternative embodiment of the present invention. Mass spectrometer system 200 comprises skimmer plate 52 instead of quadrupole rod set 26 and interquad barrier 28 in like fashion to mass spectrometer system 100, and further has quadrupole rod set 36 configured as a first ion trap and quadrupole rod set 46 configured as a second ion trap. Thus, in mass spectrometer system 200, ions can pass through high-pressure collision cell after ejection from first ion trap 36 and before accumulation in second ion trap 46. First and second ion traps 36, 46 can both be maintained at low pressure. Note also that in the configuration of mass spectrometer system 200, RF containment voltages can be supplied independently to first and second ion traps 36, 46 because, as illustrated, no capacitive coupling is provided between them. Of course, mass spectrometer 200 system in other embodiments can be reconfigured to provide capacitive coupling between first and second ion traps 36, 46.

Figure 6:
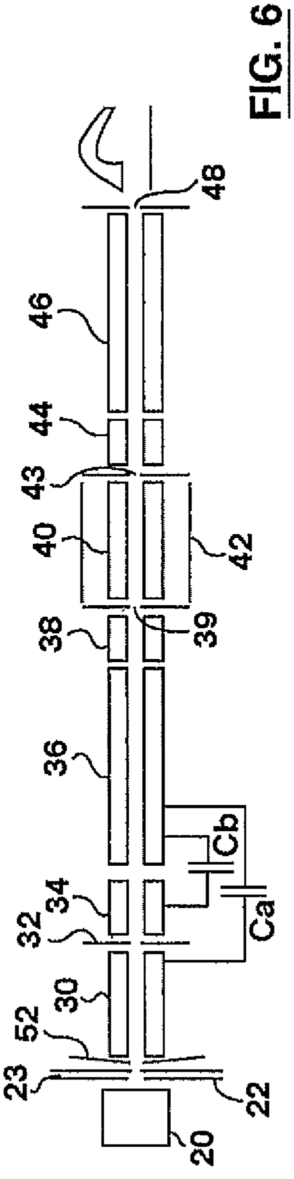
FIG. 6 is a block diagram illustrating a tandem linear ion trap mass spectrometer system that can be configured to implement a method according to an aspect of an alternative embodiment of the present invention.

FIG. 6 illustrates a block diagram of mass spectrometer system 300 configured according to an alternative embodiment of the present invention. Mass spectrometer system 300 comprises skimmer plate 52 instead of quadrupole rod set 26 and interquad barrier 28 in like fashion to mass spectrometer system 100 and 200, and further has quadrupole rod set 30 configured as a first ion trap and quadrupole rod set 36 configured as a second ion trap. Capacitor Ca now couples first and second ion traps 30, 36, while capacitor Cb similarly couples RF stubby 34 and second ion trap 36. Thus, mass spectrometer system 300 is configured to have the RF containment voltages provided to first and second ion traps 36, 46 using capacitive coupling and one or more voltage sources (not shown).

Figure 7:
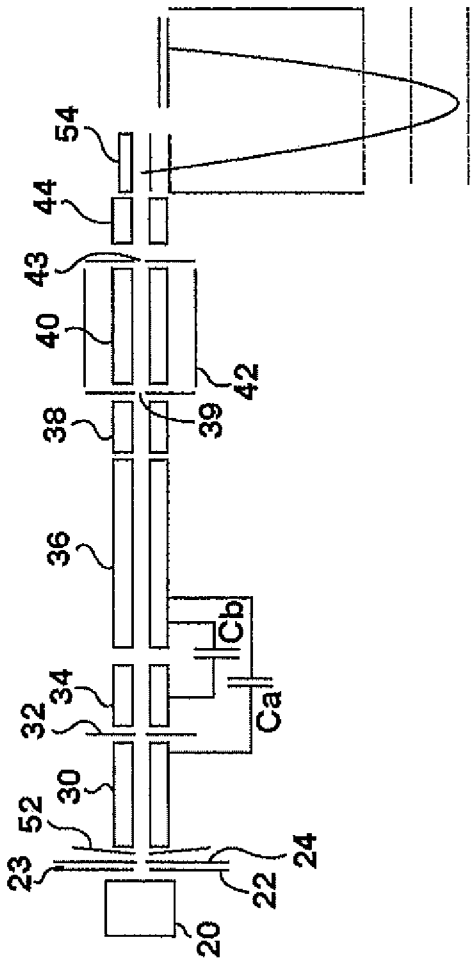
FIG. 7 is a block diagram illustrating a tandem linear ion trap mass spectrometer system that can be configured to implement a method according to an aspect of an alternative embodiment of the present invention.

FIG. 7 illustrates a block diagram of mass spectrometer system 400 configured according to an alternative embodiment of the present invention. Mass spectrometer system 400 differs from mass spectrometer system 300 in terms of the detection method used to detect ions mass-selectively ejected from second ion trap 36. In particular, mass spectrometer system 400 comprises on orthogonal time-of-flight mass spectrometer 54 that can be used to detect and distinguish ions as is known to those skilled in the art.

Figure 8A:
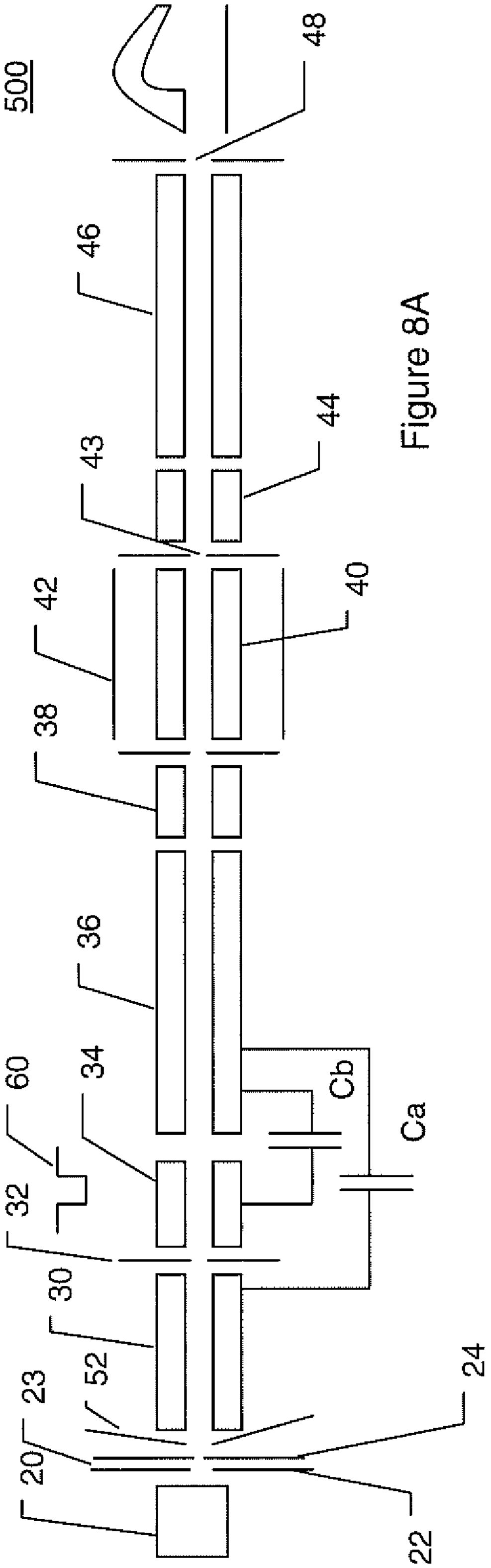
FIG. 8A is a block diagram illustrating an alternative configuration of a tandem linear ion trap mass spectrometer system according to an aspect of the applicant's teachings.
Figure 8B:
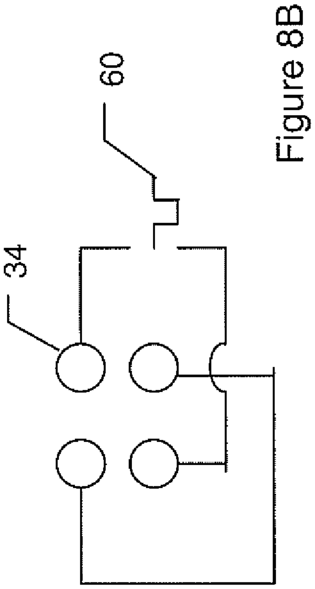
FIG. 8B is a sectional diagram showing the details of the timed ion selector in FIG. 8A.

FIG. 8A illustrates an alternative configuration of a tandem linear ion trap mass spectrometer system 500 according to an aspect of the applicant's teachings. In system 500, RF stubby rod set 34 can be used as a timed-ion-selector (TIS). The pulsed DC voltage 60 applied to the RF stubby rod set 34 can be applied to eject unwanted ions. The pulsed DC voltage 60 can be, but is not limited, to a quadrupolar voltage or a dipolar voltage. The DC applied to the RF stubby rod set 34 can be but is not limited to one pair of rods or two pairs of rods that ejects or deflects ions when the pulsed DC voltage 60 is applied. When applied in a quadrupole fashion, the pulsed DC voltage 60 can be mass-dependent and can correspond to the Mathieu parameter a having a value that causes the ion trajectory of the unwanted ion to become unstable in the TIS (i.e. the RF stubby rod set 34). Because unwanted ions are ejected, only the ions of interest are transferred to the quadrupole rod set 36 where they will accumulate when it acts as an ion trap. FIG. 8B is a sectional drawing showing the details of RF stubby rod set 34 configured to operate as a TIS.

Figure 9A:
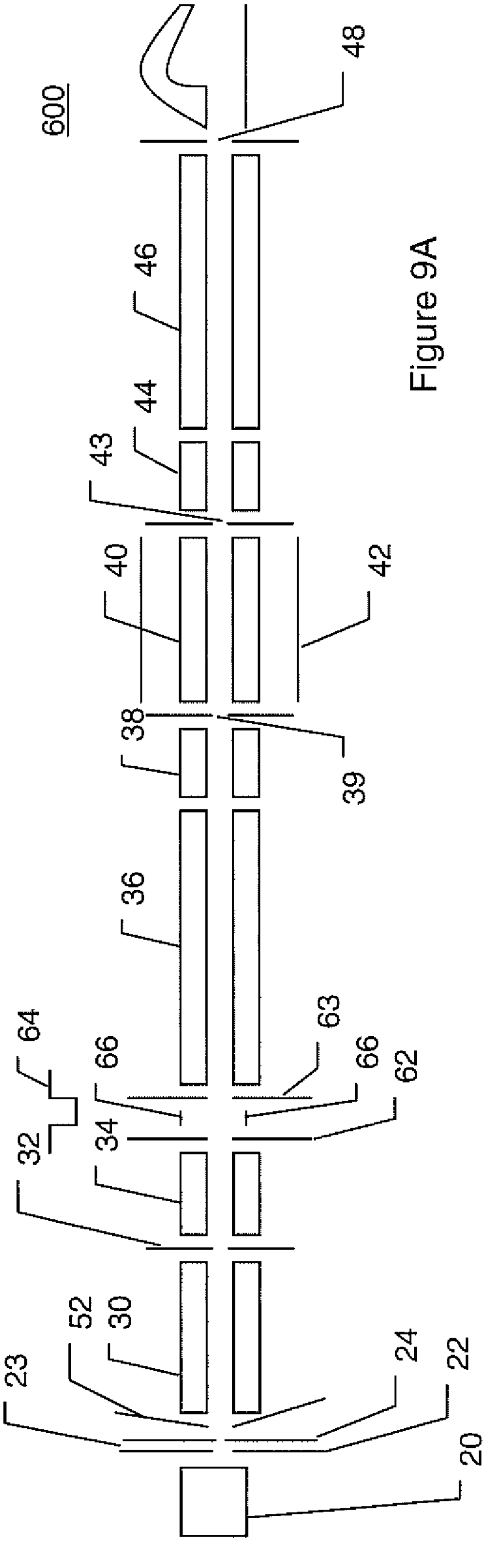
FIG. 9A is a block diagram illustrating an alternative configuration of a tandem linear ion trap mass spectrometer system according to an aspect of the applicant's teachings.

FIG. 9A illustrates an alternative configuration of a tandem linear ion trap mass spectrometer system 600 according to an aspect of the applicant's teachings. In system 600, the RF stubby rod set 34 is configured to operate as a low pressure trap. Additional lenses or interquad barriers 62, 63 are positioned between the stubby rod set 34 and quadrupole rod set 36. In this example, auxiliary electrodes 66 can be a set of four plates arranged in a quadrupole configuration to form a transmission window for the ion beam. Auxiliary electrodes 66 are oriented generally orthogonal to trajectory of the ion beam and are positioned between the interquad barriers 62, 63, such that the electrodes are substantially parallel to the axis of the ion beam. In another example, the auxiliary electrodes 66 can be a top pair of parallel plates and a substantially bottom pair of parallel plates forming a rectangular transmission window. It can be appreciated that other orientations and configurations of the auxiliary electrodes 66 are also possible as long as a transmission of suitable size and shape is defined. For example, plates of different cross-sectional shapes can also be used.

Figure 9B:
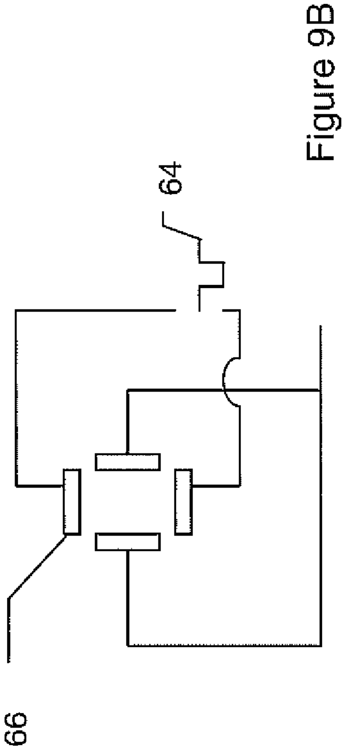
FIG. 9B is a sectional diagram of the electrodes in FIG. 9B operating as a timed ion selector.

FIG. 9B is a cross sectional diagram detailing the auxiliary electrodes of FIG. 9A acting as a TIS. The auxiliary electrodes can be coupled to a controllable voltage source (not shown), which can be configured to provide a pulsed DC voltage 64, i.e. a square wave pulse train. Application of the pulsed DC voltage 64 to the auxiliary electrodes 66 can establish an ion ejection or deflection field between the electrodes during time intervals when the pulsed DC voltage is high. Unwanted ions are deflected or ejected from the ion beam. Ions of interest are left and transferred to the second trap or quadrupole rod set 36. After a short cooling period, ions of interest are mass selective axially ejected from the quadrupole rod set 36.

Figure 10:
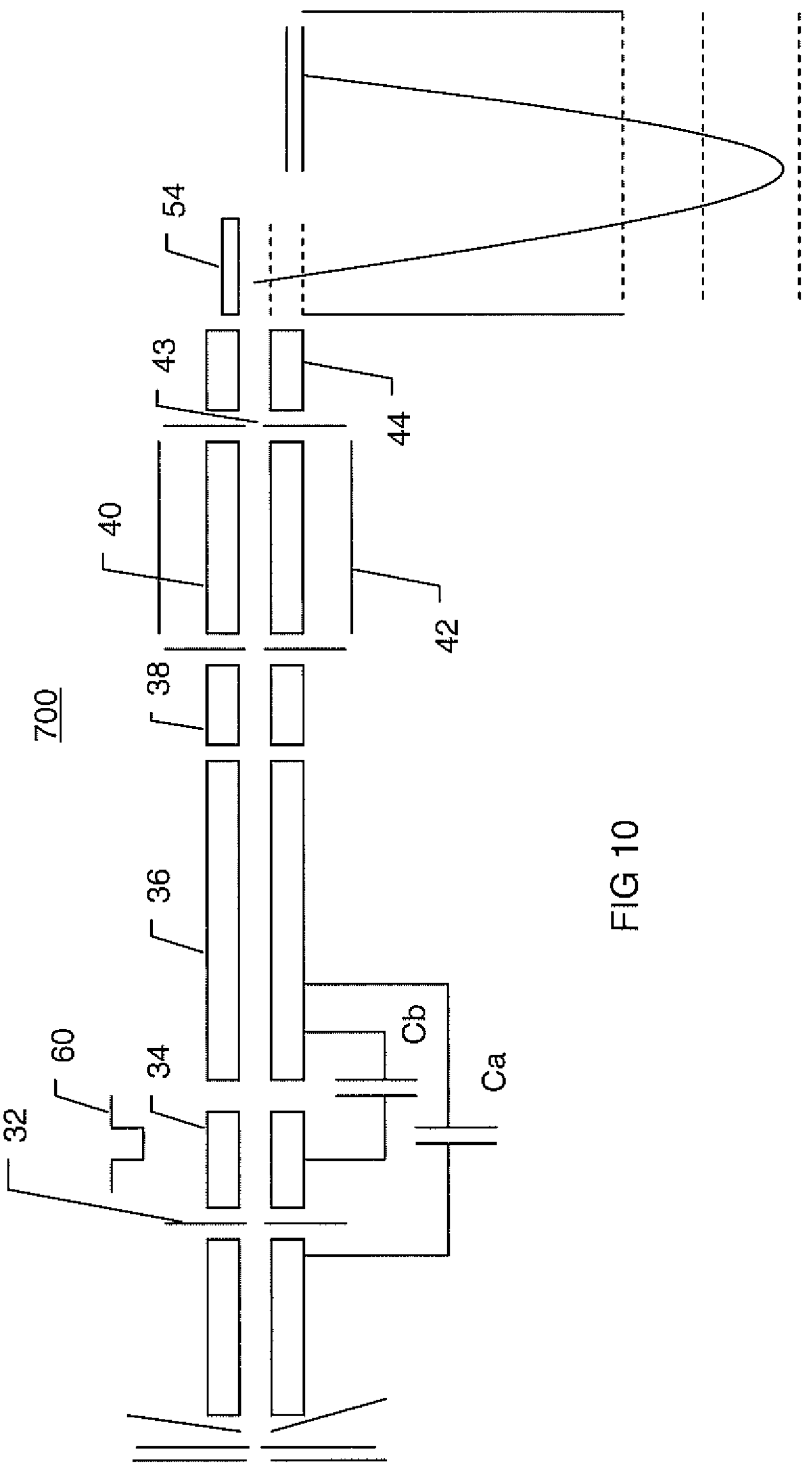
FIG. 10 is a block diagram illustrating an alternative configuration of a tandem linear ion trap mass spectrometer system according to an aspect of the applicant's teachings.

As it is known in the art, the configurations of FIGS. 8A and 9A may be used in combination with other kinds of devices such as a time-of-flight spectrometer. FIG. 10 shows a mass spectrometer system 700 having the configuration of FIG. 8A in combination with an orthogonal time-of-flight mass spectrometer 54 that can be used to detect and distinguish ions as is known to those skilled in the art. In this example, the tandem trap system 600 is used as a multiplexing device in conjunction with a TOF mass spectrometer.

Figure 11:
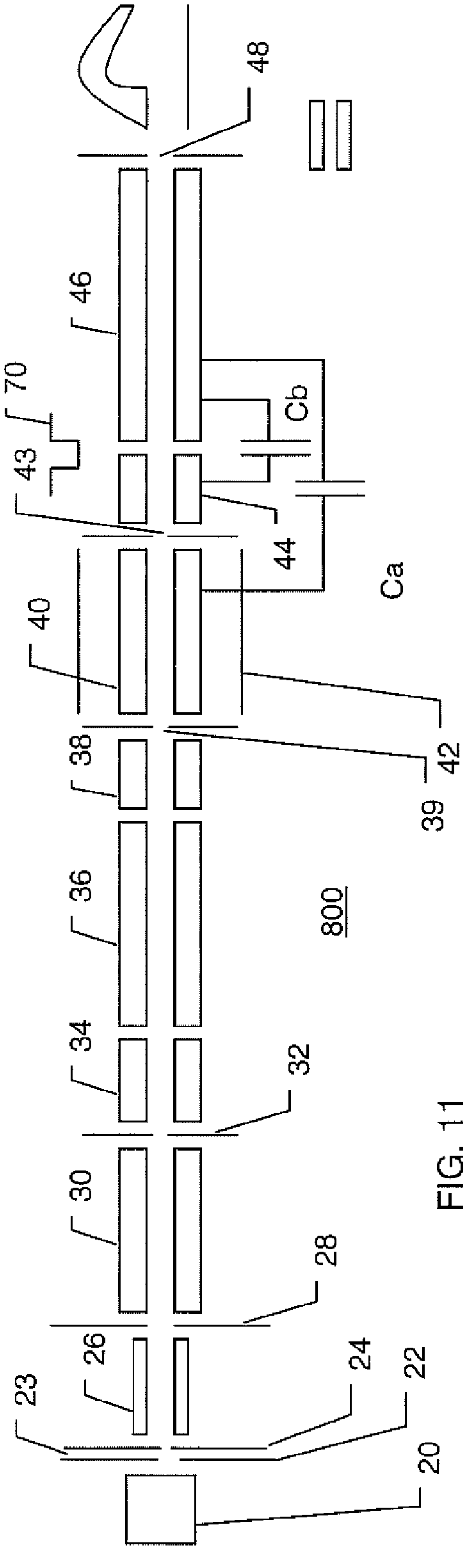
FIG. 11 is a block diagram illustrating an alternative configuration of a tandem linear ion trap mass spectrometer system according to an aspect of the applicant's teachings.

FIG. 11 shows an alternative configuration of a tandem linear ion trap mass spectrometer system 800 according to an aspect of the applicant's teachings. In mass spectrometer system 800, quadrupole set 40 acts as an ion trap and the RF stubby rod set 44 can be used as a TIS to select product ions from the collision cell 42 while ejecting unwanted fragmented ions. The pulsed DC voltage 70 can be, but is not limited to, a quadrupolar voltage or a dipolar voltage. The DC applied to the RF stubby rod set 44 can be but is not limited applied to one pair of rods that ejects or deflects ions when the pulsed DC voltage 70 is applied. Because unwanted ions are ejected, only product ions of interest are accumulated in the quadrupole rod set 46 when it acts as an ion trap.

Figure 12:
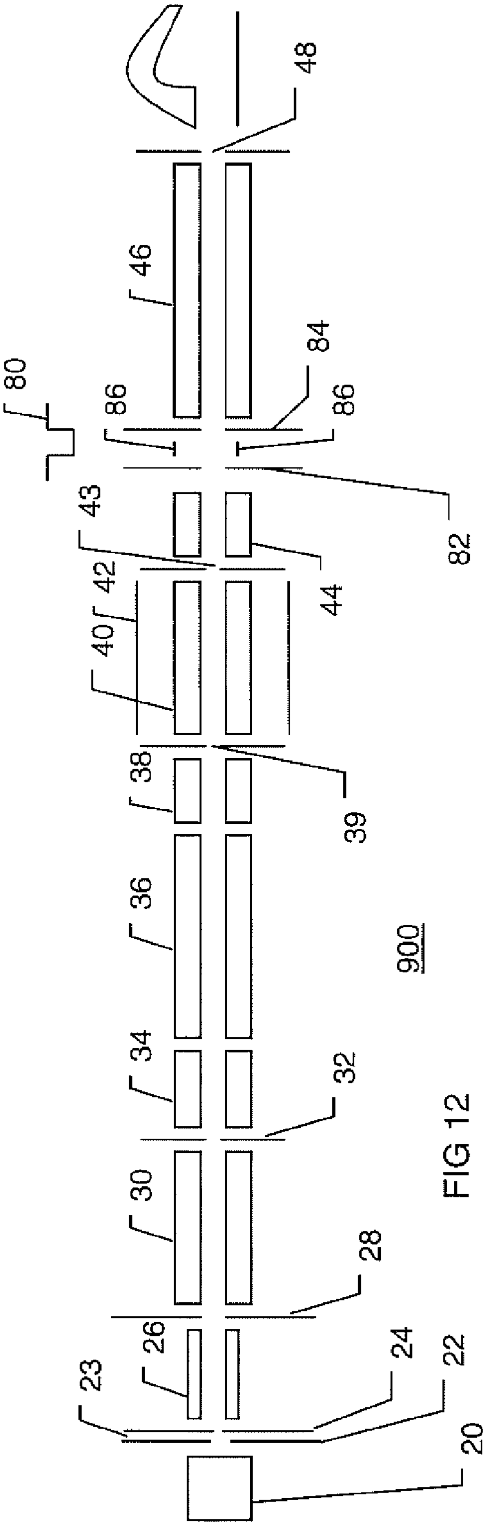
FIG. 12 is a block diagram illustrating an alternative configuration of a tandem linear ion trap mass spectrometer system according to an aspect of the applicant's teachings.

FIG. 12 shows an alternative configuration of a tandem linear ion trap mass spectrometer system 900 according to an aspect of the applicant's teachings. In mass spectrometer system 900, the RF stubby rod set 44 is configured to operate as a low pressure trap. Additional lenses or interquad barriers 82, 84 are positioned between the stubby rod set 44 and quadrupole rod set 44. Auxiliary electrodes 86 can be but are not limited to a set of four plates arranged in a quadrupole configuration to form a transmission window positioned between the interquad barriers 82, 84. This transmission window is oriented such that the electrodes are substantially parallel to the axis of the ion beam. In another example, the auxiliary electrodes 86 can be a top pair of parallel plates and a substantially bottom pair of parallel plates forming a rectangular transmission window. It can be appreciated that other orientations and configurations of the auxiliary electrodes 66 are also possible as long as a transmission of suitable size and shape is defined. For example, plates of different cross-sectional shapes can also be used.

The auxiliary electrodes can be coupled to a controllable voltage source (not shown), which can be configured to provide a pulsed DC voltage 80, i.e. a square wave pulse train. Application of the pulsed DC voltage 80 to the auxiliary electrodes 86 can establish an ion ejection or deflection field between the electrodes during time intervals when the pulsed DC voltage is high. Unwanted ions are deflected or ejected from the ion beam. Ions of interest are left and transferred to the second trap or quadrupole rod set 36. After a short cooling period, which is dependent on the scan rate of the traps, ions of interest are mass selective axially ejected from the quadrupole rod set 46 toward the detector.

Both the configurations of FIGS. 11 and 12 can be used in enhanced MS (EMS) scan mode when quadrupole rod set 36 transmits the whole mass range or large windows of the ions with the selected mass-to-charge range. In this case, ions are not fragmented in quadrupole set 40.

Other variations and modifications of the invention are possible. For example, multipoles other than quadrupoles can be used to implement different aspects of the invention. Further, mass spectrometer or ion trap configurations in addition to those described above can also be used to implement different aspects of the invention. For example, instead of mass selective axial ejection ions can be radially ejected from one linear ion trap to another ion trap. Radial ejection can be performed through one of the rods out of the main RF poles, as described by the U.S. Pat. No. 5,420,425 B1, or through a slot in an auxiliary rod interposed between the main RF poles as described by U.S. Pat. No. 6,770,871 B1. In addition, techniques of mass selective axial ejection other than those described above can also be employed, i.e. U.S. Pat. No. 5,783,824, WO7072038A2, US2007045533 and U.S. Pat. No. 7,084,398 B2. In the case of the last mentioned technique where the ions get ejected out of the first trap from high to low mass, the second trap can be scanned from high to low mass.

All such modifications and variations are believed to be within the sphere and scope of the invention as defined by the claims.

The invention claimed is:

1. A method of operating a mass spectrometer system having a first ion trap and a second ion trap, the method comprising:

a) accumulating ions in the first ion trap;

b) mass-selectively ejecting ions out of the first ion trap through a timed-ion selector, the timed-ion selector located between the first ion trap and the second ion trap;

c) applying a pulsed DC voltage to the timed-ion selector for deflecting a first group of unwanted ions from the first plurality of ions, leaving a first portion of selected ions having masses within a first mass range;

d) transmitting the first portion of selected ions out of the timed-ion selector and into the second ion trap to accumulate ions in the second ion trap;

e) mass-selectively ejecting ions out of the second ion trap while ions are being mass-selectively ejected from the first ion trap through a timed-ion selector into the second ion trap, and f) controlling a scan rate of ions being mass-selectively ejected into the second ion trap from the first ion trap using a first RF voltage and a first auxiliary AC excitation waveform provided to the first ion trap, and controlling a scan rate of ions being mass-selectively ejected out of the second ion trap using a second RF voltage and a second auxiliary AC excitation waveform provided to the second ion trap, such that during an operating time interval during step (e) a ratio of the first RF voltage to the second RF voltage remains substantially constant.

2. The method of claim 1, wherein step (e) comprises continuously mass-selectively ejecting ions out of the first ion trap through the timed-ion selector and into the second ion trap; and continuously mass-selectively ejecting ions out of the second trap such that the second ion trap is characterized by a variable operating mass range.

3. The method of claim 2, wherein the variable operating mass range comprises a range of increasing ion masses over an operating time interval.

4. The method of claim 2, wherein step (e) is time delayed relative to commencement of step (d) by a delay time interval.

5. The method of claim 4, wherein over an operating time interval during step (e.), variable operating mass range at any operating time is substantially equal to the mass range of ions accumulated in the second ion trap at the end of the delay time interval.

6. The method of claim 3, wherein the variable operating mass range comprises a substantially constant mass range of increasing ion masses.

7. The method of claim 4, further comprising controlling a scan rate of ions being mass-selectively ejected into the second ion trap from the first ion trap using a first RF voltage provided to the first ion trap and controlling a scan rate of ions being mass-selectively ejected out of the second ion trap using a second RF voltage provided to the second ion trap.

8. The method of claim 7, wherein the first and second RF voltages are independently provided to the first and second ion traps.

9. The method as defined in claim 1, wherein the first and second ion traps are capacitively coupled using one or more coupling capacitors, and the ratio of the first RF voltage to the second RF voltage is controlled by selecting the capacitances of the one or more coupling capacitors.

10. The method as defined in claim 9, wherein the first auxiliary AC excitation waveform and the second auxiliary AC excitation waveform are determined such that the scan rate of ions being mass-selectively ejected into the second ion trap substantially equals the scan rate of ions being mass-selectively ejected out of the second ion trap.

11. The method as defined in claim 4, further comprising selecting a cooling time interval for retaining ions in the second ion trap such that the cooling time interval substantially equals the delay time interval.

12. The method as defined in claim 4, wherein the first ion trap has a starting mass range at the end of step (a);

and wherein the variable operating mass range at any operating time after the delay time interval is substantially equal to a scan rate of ions being mass-selectively ejected into the second ion trap multiplied by the delay time interval; and the variable operating mass range being less than half of the starting mass range.

13. The method as defined in claim 12 wherein the variable operating mass range is less than a fifth of the starting mass range.

14. The method as defined in claim 12 wherein the variable operating mass range is less than a tenth of the starting mass range.

15. The method of claim 7, wherein the first RF voltage at any operating time substantially corresponds to the second RF voltage at a time equal to the operating time plus the delay time interval.

16. The method of claim 1 wherein step (e) further comprises applying a pulsed DC voltage to the timed-ion selector for deflecting a second or more group of unwanted ions that are mass selectively ejected from the first ion trap through the timed ion selector into the second ion trap.

* * * * *